Figure 1:
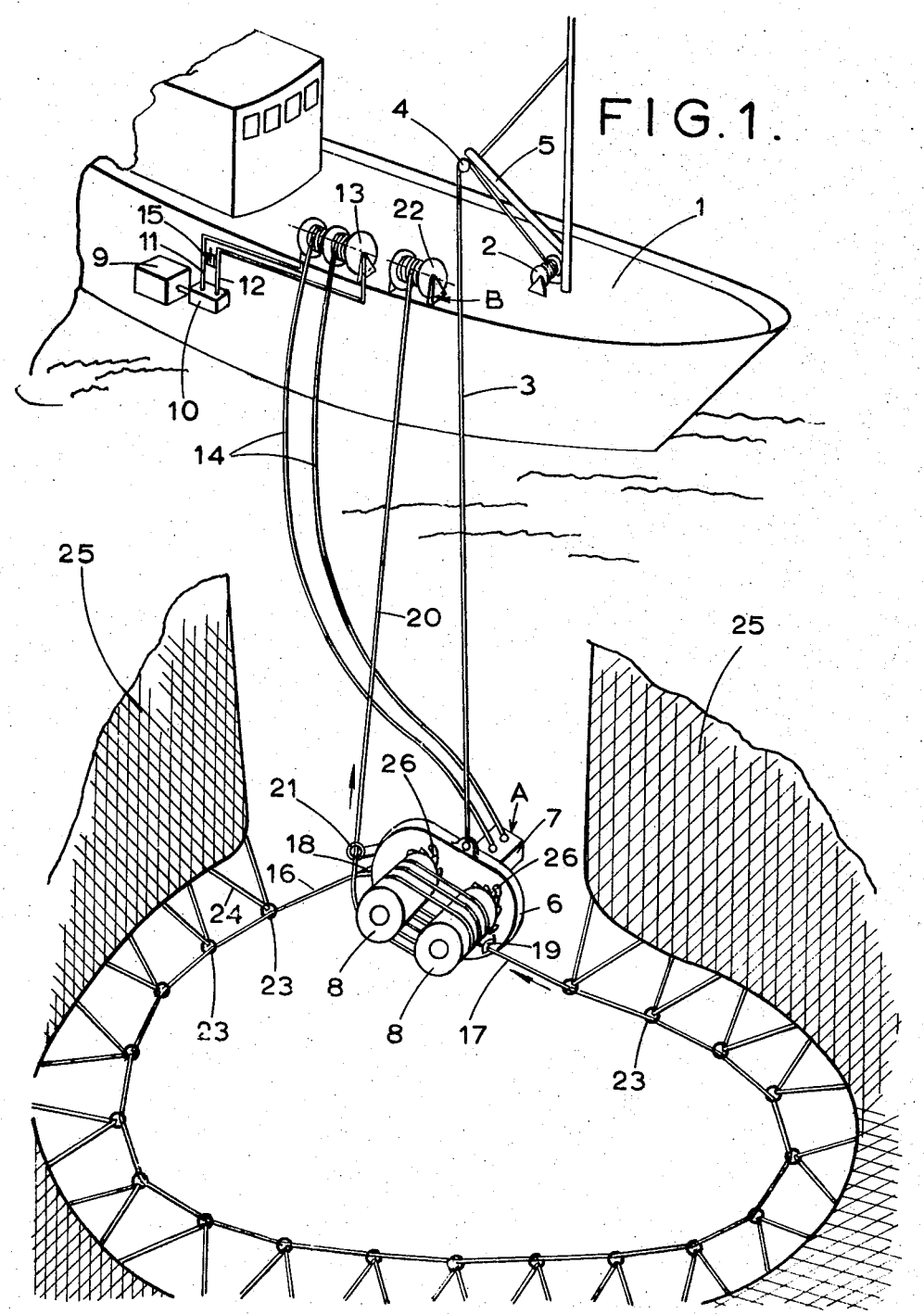

United States Patent
Halvorsen

[15] 3,687,418
[45] Aug. 29, 1972

[54] METHOD AND APPARATUS FOR HAULING UNDERWATER ROPES AND THE LIKE

[72] Inventor: Jacob Schoning Halvorsen, Oslo, Norway

[73] Assignee: Rapp Fabrikher A/S, Boda, Norway

[22] Filed: Aug. 13, 1970

[21] Appl. No.: 63,555

[52] U.S. Cl. .....................254/175.7, 37/55, 37/115, 37/71, 43/8
[51] Int. Cl. ............................................B66d 1/76
[58] Field of Search ......254/175.5, 175.7; 37/55, 71, 37/115; 43/8, 6.5

[56] References Cited

UNITED STATES PATENTS

| | | | |
|---|---|---|---|
| 2,938,707 | 5/1960 | Allenbaugh | 254/187 X |
| 2,496,101 | 1/1950 | Massey | 37/71 |
| 3,044,723 | 7/1962 | Blue | 254/175.7 X |
| 871,343 | 11/1907 | Ketcham | 43/8 X |
| 3,112,575 | 12/1963 | Lewis et al. | 43/8 |
| 3,365,823 | 1/1968 | Vogt | 37/71 |

FOREIGN PATENTS OR APPLICATIONS 1,169,673  8/1968  Great Britain..........254/175.7

Primary Examiner—Evon C. Blunk
Assistant Examiner—Merle F. Maffei
Attorney—Waters, Roditi, Schwartz & Nissen

[57] ABSTRACT

In marine operations with underwater lines, such as fishing lines, a method is provided of hauling a length of such line by means of two separate and mutually spaced hauling means. A first hauling means includes a submersible hauling means adapted to be suspendedly supported in submerged position approximately at the level of said the underwater line and is able to haul the line in frictional engagement therewith. There is provided a means to maintain an oppositely directed counter balancing force in the first hauling means, whereby the line is hauled in substantially horizontal direction with suitable speed through the first hauling means. The second hauling means for the line is mounted on a vessel, the length of the line being hauled and delivered from the submerged hauling means being hoisted up by the second hauling means and stored on the vessel.

11 Claims, 3 Drawing Figures

Patented Aug. 29, 1972

3,687,418

3 Sheets-Sheet 1

METHOD AND APPARATUS FOR HAULING UNDERWATER ROPES AND THE LIKE

The present invention relates to a new method for hauling ropes and the like located in an underwater position, and the invention relates furthermore to a system for such hauling and a portable means to be used in connection therewith.

The invention is particularly useful in connection with purse seine fishing for hauling the pursing line on a set purse seine and shall be described for such use, but the invention is not restricted to such use since it can with similar advantage be utilized for other objects, for instance in connection with constructional works under water, submarine explorations, including explorations of the sea bottom, such as bottom scraping in order to collect material from the bottom and the like.

From U.S. Pat. No. 3,604,139 (Pending application Ser. No. 823,373) is known a method and apparatus for hauling the purse line on a purse seine set out in the water. This winch assembly comprises a motordriven winch including a drum for winding up the pursing line, the winch assembly being submerged to the level of the purse line whereafter the winch is actuated with the result that the purse line is hauled horizontally or substantially horizontally in the sea and wound up on the drum. Prior to this invention the purse line was hoisted up by a winch on the fishing vessel. This had the well known and substantial drawback that the purse line, during the pursing of the seine, also was hauled or pulled upwards at a certain slope. Hereby is reduced not only the fishing ability of the seine, but it is required to use a force which is several times as high as the force required to carry out the hauling of the line as such. By means of the submersible winch assembly disclosed in the beforementioned patent one may to a large part overcome the beforementioned drawbacks in connection with purse seine fishing, but practical operations with a such assembly has shown it to have certain operational limitations. The size of such a winch assembly will thus be large and only large fishing vessels will be able to carry it.

A principal object of the invention is therefore to provide an improved method and means for hauling underwater ropes and line, particularly for hauling pursing lines.

A particular object of the invention is to provide a new method and system for hauling underwater lines utilizing gear of comparatively small size and weight compared with the pulling or hauling force available.

Another object of the invention is to provide a new method and system for progressive or stepwise hauling of an underwater line whereby the line initially is hauled in more or less horizontal direction and thereafter is hoisted up and stored on the vessel.

The method in accordance with the invention generally comprises the utilization of two separate hauling means, namely one first hauling means including a submersible hauling winch adapted to be suspendedly supported in submerged position approximately at the level of said underwater line and able to haul said line in frictional engagement therewith, providing a means to provide an oppositely directed counter balancing force in said first hauling means and hauling said line in substantially horizontal direction with suitable speed through said first hauling means, and a second hauling means located on said vessel, the length of said line being hauled and delivered from said submerged hauling means being hoisted up by said second hauling means and stored on the vessel.

The means for frictional engagement between the line and the hauling means comprises preferably one or more pulleys or blocks about which the rope is positioned with one or more turns such that the pulling force is obtained by means of the frictional resistance generated when a rope is strained about a pulley or sheave. As known, the frictional resistance and thereby the tension in the rope will be a function which depends upon the coefficient of friction between the rope and the pulley, the angle of contact (the arc in radians) and finally the tension in the rope leaving the pulley. In other words, keeping the other factors constant, one can vary the tension in the ingoing rope on the pulley by varying the tension in the rope on the outgoing side of the pulley. These principles are effectively utilized in connection with the method and system in accordance with the present invention.

The counter force in the submerged hauling means, that is the necessary force to keep the hauling means in substantially stationary position in the water by providing an oppositely directed balancing force, may be provided in several ways depending upon the job to be done. In connection with purse seine fishing, the counter force is provided by attaching the other end of the purse line to the frame of the hauling means since, as known, the respective ends of the purse line in a set seine complete a circle or ring when the respective ends are put together.

If the invention however, is utilized for other operations, such as scraping of the sea bottom, the submersible hauling winch can be anchored to the bottom thereby providing the necessary counter force to keep the hauling means in a fixed position.

It will be understood that the rope or line delivered from the submersible hauling winch should thus be maintained in a suitable tension. It is not difficult to design the hauling winch such that the tension in the delivered rope or line can be practically zero but in a preferred embodiment of the invention the winch is so designed that it is necessary to maintain a certain tension in the delivered rope provided there shall occur no slip in the engagement between the rope and the hauling means, making it possible to control the hauling of the submersed winch by controlling the tension in the rope delivered from the winch and hoisted up to the hauling winch mounted on the vessel.

Figure 2:
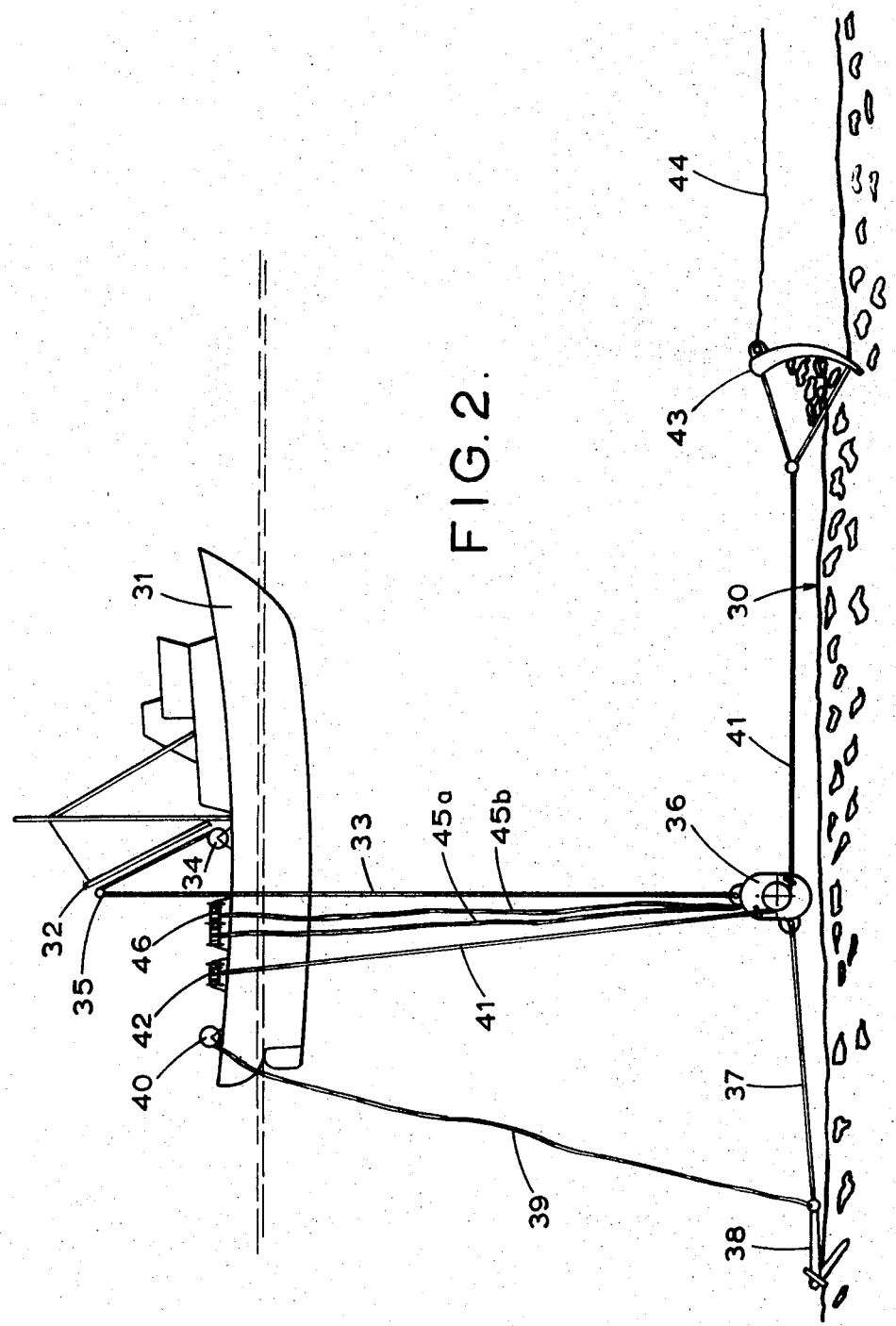
Figure 3:
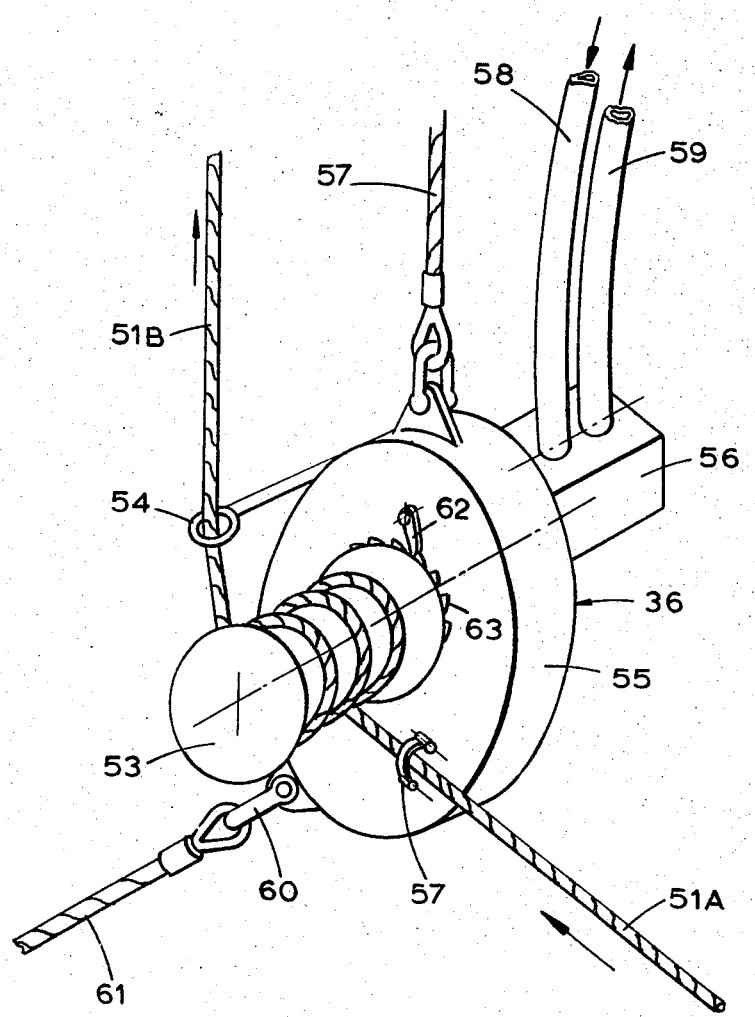

The method and the hauling system in accordance with the invention shall be described hereafter with reference to the accompanying drawings illustrating an embodiment of the invention designed for purse seine fishing and wherein:

FIG. 1 is a schematic perspective view illustrating how the method and system can be utilized for pursing the purse line on a purse seine set from a fishing vessel, FIG. 2 is an elevation view illustrating how the method and system can be utilized for carrying out scraping operations along the bottom of the sea, and FIG. 3 is a perspective detailed view illustrating a portable submersible hauling means in accordance with the invention.

In FIG. 1 a vessel 1 is provided with a ship winch 2 for a hoisting cable 3 running about a pulley 4 mounted on the boom 5 and from there extending down into the sea. The cable 3 supports a submerged winch means which in the shown example comprises a housing or frame 6 enclosing the driving gear and supporting a hydraulic motor 7 and two pulleys or drums 8. In the vessel 1 is mounted a prime mover 9, for instance a diesel engine, driving a fluid pump 10. The pump 10 is connected to the pipe-lines 11 and 12 to a double hose drum 13, preferably provided with co-axial couplings in a fashion known per se. The pressure fluid is conveyed through the fluid pressure hoses 14 to the hydraulic motor 7 and returned to the pump 10. By means of a shunt valve 15 a larger or smaller part of the fluid flow from the pump end can be delivered, whereby the speed of the motor 7 and the drums 8 can be controlled. The end 16 on the purse line 17 is attached to an eye 18 on the winch frame. The purse line 17 runs in the usual fashion through a number of bridle rings 23 arranged along the bottom on the purse seine and from there the purse line runs through a guiding ring 19 attached to the frame and onto the drums or pulleys 8. The purse line 17 runs about the two pulleys 8 in a sufficient number of turns in order to obtain the desired factor of friction for carrying out the hauling and passes through a second guiding ring 21 and the delivered run or length 20 of the line is hoisted up on the vessel by means of a second hauling means 22 and is preferably stored on a drum or the like. In a preferred embodiment, the second hauling winch on the vessel and the drum is combined in a single unit 22 as shown. As previously mentioned, the purse line runs through all the bridle rings 23 connected to the bridle ropes 24 attached along the bottom or leadline 25. When the purse line 17 is almost entirely hauled in by means of the hauling means A, all the bridle rings 23 will be close together adjacent the winch A. At this stage of the pursing the motor 7 is stopped. It is noted that the operators on the vessel will have no difficulty in knowing when the beforementioned stage is reached since the tension in the purse line 20 extending up to the winch 22 will increase. In order to prevent the tension in the purse line from pulling that part of the line backwards off the pulleys 8, it is preferred to arrange ratchet pawls 26 on the pulleys as shown. With the ratchet pawls 26 the pressure in fluid line 14 and on certain conditions also the tension in the run 20 of the purse line. The submerged hauling winch A together with the purse line and the bottom part of the purse seine may now be hoisted on the vessel by means of the winch 2 via the hoist cable 3. Simultaneously, the last run of the purse line 20 and the pressure hoses 14 are wound up on the respective drums 13 and 22.

The submersible hauling winch is preferably built into an encompassing enclosure in order to protect the moving parts etc. and to prevent fishing gear, ropes, seaweed etc., from becoming entangled in the pulleys etc. The housing is however, for sake of clarity omitted in the drawings since it does not constitute an integral part of the present invention.

It shall furthermore be noted that in FIG. 1 is shown a submersible hauling winch with a twin set of frictional pulleys. It shall be understood however, that it is fully possible to provide a winch with one single frictional pulley and such an embodiment is shown in FIG. 3. A twin pulley winch is however, preferred since it offers the possibility alternatively to haul in both ends of the pursing line simultaneously, although this usually is not the preferred way of practicing the invention since pulling at both ends of the pursing line involves problems in connection with maintaining correct tension in the runs of the purse line extending from the submerged winch to the vessel, and other inconveniences.

FIG. 2 shows an example of how to practice the invention for carrying out a scraping operation along a sea bottom 30. From the boom 32 on the vessel 31 extends a hoisting cable 33 from a winch 34 about a block 35 and down into the water. The cable is attached to the submersible winch 37, which also is attached to an anchoring cable 36 attached to an anchor 38. The anchor is also preferably connected with a winch 40 aboard the vessel 31 with a rope 39 in order to be able to release or loosen the anchor from the sea bottom and hoist it up.

The submersible winch 36 is in this case provided with one single block pulley means, about which the rope 41 is attached in a sufficient number of turns before it runs up to the second winch 42 on the vessel and which during the operation of the system is operated to hoist up and maintain the rope under a desirable tension while continuously storing the length of rope hoisted up. The force necessary to provide the necessary trailing force in the part of the rope 41 leaving the frictional block pulley will be very small relative to the pulling force provided by the winch itself. The anchoring cable 37 will provide the balancing counter force of the same magnitude. A further force is the weight of the winch unit 36 with the result that the winch 36 will remain in the same position in the water, i.e. it will be subjected to a force attempting to hoist the winch 36 upwards. Practical trials have in fact shown that it is very simple to adjust the frictional engagement between the rope 41 and the block pulley on the winch 36 such that the pulling force and the hauling of the horizontally extending line 41 can easily be maintained and without slip furthermore can be varied by adjusting the tension in the upwardly extending length of the line 41. Thus by increasing e.g. by doubling the tension in the hoisting part of the line 41, one can increase the pulling force or tension in the line part 41a four times. To the other free end of the rope 41 extending along the bottom is attached a scraper means 43 the object of which is to scrape and gather together objects resting on the sea bottom, for instance shells, stones etc. To the scraper means can be attached also a further cable or chain 44 extending up to the vessel or to a second vessel (not shown). The purpose of the cable 44 may be to loosen the scraper means if it jams in the sea bottom. Alternatively, the cable 44 can be used to return the scraper means to an initial remote plate in order to carry out repeated scraper operations. As will be understood, the frictional engagement between the block pulley on the winch 36 and the pulling rope 41 provides also a safety measure since if the scraper means 43 during the scraping operation suddenly is jammed, for instance by a large stone, this only results in slip between the line and the block pulley on the winch 36, and the operator aboard the vessel will notice that the winch asthe same, said winch being frictionally coupled to a line to pull the line therethrough, the second hauling means comprising a second winch mounted on the vessel including an independent drive means, said second winch being connected to said line to hoist up the length of line pulled through the submersible hauling means and to apply tension thereto for stabilizing the submersible winch in a suspended submerged position.

7. In a hauling system as claimed in claim 6 wherein said second hauling means includes drum means mounted on the vessel for storing the line hoisted up by the winch of the second hauling means.

8. In a hauling system as claimed in claim 6 wherein said first hauling means comprises, a frame, an attachment means on said frame for a suspension cable from the vessel, a hydraulic motor on said frame with supply and discharge connections for hydraulic pressure fluid, said winch of the first means comprising a frictional pulley block drivingly connected to said motor, said line being wound on said pulley block, two guide means mounted on the frame for guiding said line to and from said pulley block respectively, during the hauling, and means attached to said frame for holding the frame in stable underwater position during hauling.

9. In a hauling system as claimed in claim 8 wherein said means for holding said frame in stable underwater position comprises a cable attached to said frame, and anchoring means connected to said cable and adapted for being anchored to the sea bottom.

10. In a hauling system as claimed in claim 6 comprising ratchet and pawl means between said pulley block and said frame for preventing rotation of said pulley block in a direction opposite to hauling.

11. In a hauling system as claimed in claim 8, wherein said first hauling means comprises a second pulley block extending parallel to the first block and drivingly connected to said motor, said line being wound on both said blocks.

* * * * * sembly 42 aboard the vessel will discontinue to haul in the line 41. The lines 45a and 45b indicate the high pressure and return fluid hoses extending from the hydraulic motor on the winch unit 36 to the source aboard the vessel and which are suitably wound up upon motor driven drums 46.

The submersible hauling winch of FIG. 3 is of a type utilized in connection with the operation illustrated in FIG. 2. The rope portion 51A passes through a guiding ring 57, onto the block pulley 53 and around same a suitable number of turns, and runs off through the output guiding ring 54 whereafter it travels as portion 51B up to the hoisting winch aboard the vessel. As will be understood, the portion 51B is kept under a suitable tension in order to provide the necessary hauling tension in the portion 51A. The frame or housing 55, which supports the motor 56 and the block pulley 53, contains the necessary gears etc. for journalling the block pulley and necessary power transfer between this and the motor. These parts are of conventional construction and have not been described or shown in detail. The winch unit 36 is supported by a support cable 57. The motor 56 is supplied with power from the vessel through the conduit 58. In the shown embodiment the motor is a hydraulic motor and high pressure hydraulic fluid is supplied and returned by the two fluid lines 58 and 59. To the support eye 60 is attached a rope or chain 61. If the submersible winch is utilized in connection with purse seining such as illustrated in FIG. 1 the rope 61 corresponds to the end 16 of the pursing line while in the example illustrated in FIG. 2 the line 61 corresponds to the anchoring cable 37. In order to insure that the rope 51A is not pulled in the opposite direction, for instance if the power supply to the motor 56 should fail, or be stopped from the operators on the vessel, for instance during hoisting of the winch to the surface with a load suspended in the rope 51, the block pulley 53 is provided with a ratchet wheel 63 controlled by a spring biased pawl 62 pivotally supported on the winch housing 55. It will be understood that if desired the pawl 62 can be remotely controlled from the vessel by hydraulic or electrical means such that the locking operation can be put out of operation if desired.

When the hauling of the line 16 in the example shown in FIG. 1 or the line 51A in the example shown in FIG. 3 is accomplished to a desirable degree and the submersible winch, possibly with a remaining length of the line, is to be hoisted up to the sea surface, this operation usually takes place by means of the support cable for the winch, designated with the reference numbers 3, 33 or 57 in the Figures, respectively, preferably by use of a separate hoisting winch system as shown in FIGS. 1 and 2.

It is however, no obstacle to accomplish the hoisting of the submersible winch together with the gear connected thereto by means of the line 20 in FIG. 1 and 41 in FIG. 2. In other words, in many cases the separate supporting and hoisting system for the submersible winch can be put out of operation or omitted. Thus in connection with purse seine fishing a so simplified system can offer several advantages. The separate supporting and hoisting cable 3, shown in FIG. 1, will then be omitted, whereupon the pursing line 20 will serve both as a supporting cable for the submersible winch and as a pursing line as such. In connection with purse seining with large purse seines it is however, preferred to have a separate supporting cable 3. Firstly, this is a safety measure, and secondly the pursing line can then be relatively thin and light weight since the forces required for pursing the seine without hoisting it up will be much less than the force required for hoisting the purse line together with the seine up to the vessel. Furthermore, the weight of the submersible winch unit also plays an important part of the operation of the system. The weight of the winch should of course be as small as possible, but the weight must be sufficient in order to provide the required tension in the length of the pursing or hoisting line extending from the winch to the vessel. In practical embodiments the weight of the submersible winch falls between 300–1,000 kilos which weight provides the required pull in the hoisting lines.

What is claimed is:

1. In marine operations utilizing a vessel with an underwater line, such as a fishing line, a method of hauling such line comprising submerging a first hauling device approximately at the level at which the underwater operation is to be effected, connecting the line to submerged apparatus which is to carry out the particular marine operations, frictionally coupling the line with the first hauling device such that by operation of the hauling device the line is hauled thereby and delivered therefrom, connecting an end of the line to a second hauling device on the vessel, driving said second hauling device independently of the first for hoisting the line delivered from the submerged first hauling device and storing such line on the vessel, applying a counterbalancing force to the first hauling device to oppose the applied force in the line connected to the apparatus which carries out the marine operation, and developing tension in the line delivered from the submerged first hauling device to the second hauling device to stabilize the submerged first hauling device in a suspended submerged position.

2. A method as claimed in claim 1 wherein the tension in the line between the two hauling devices by regulating the force and speed of hauling in the second hauling device, the tension in the line maintaining a predetermined frictional engagement of the line in the first hauling device.

3. A method as claimed in claim 2 wherein the counter-balancing force is applied by anchoring the first hauling device at said submerged level.

4. A method as claimed in claim 2 wherein the counter-balancing force is applied to the first hauling device by the operation of the submerged apparatus which carries out the marine operation.

5. A method as claimed in claim 4 comprising connecting the other end of the line to the first hauling device, the line then being connected to the submerged apparatus carrying out the marine operation and thereafter frictionally coupled to the first hauling device and thence connected to the second hauling device.

6. In a hauling system for a vessel engaged in marine operation with underwater lines, the combination of two separate line hauling means, the first of which comprises a portable and submersible motor driven hauling winch, means suspending said winch from the vessel, means on said vessel coupled to said winch to operate

UNITED STATES PATENT OFFICE
CERTIFICATE OF CORRECTION

Patent No. 3,687,418         Dated    August 29, 1972

Inventor(s) Jacob Schoning Halvorsen

It is certified that error appears in the above-identified patent and that said Letters Patent are hereby corrected as shown below:

On the cover sheet insert -- [30] Foreign Application Priority Data   August 13, 1969    Norway    3286/69 -- .

Signed and sealed this 20th day of March 1973.

(SEAL)
Attest:

EDWARD M. FLETCHER, JR.                ROBERT GOTTSCHALK
Attesting Officer                      Commissioner of Patents